(12) United States Patent
Shinnoki et al.

(10) Patent No.: US 8,096,600 B2
(45) Date of Patent: Jan. 17, 2012

(54) PICK-UP STYLE UTILITY VEHICLE WITH EXPANDABLE CARGO BED

(75) Inventors: Hideaki Shinnoki, Kobe (JP); Takao Kawabata, Kobe (JP); Eiji Ihara, Kobe (JP); Hidekazu Yasui, Kobe (JP); Shinichi Tamba, Kobe (JP); Masaki Tanaka, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 66 days.

(21) Appl. No.: 12/647,853

(22) Filed: Dec. 28, 2009

(65) Prior Publication Data
US 2011/0156426 A1    Jun. 30, 2011

(51) Int. Cl.
*B60N 2/36* (2006.01)
*B60N 2/00* (2006.01)
(52) U.S. Cl. ....... 296/66; 296/26.01; 296/63; 296/65.01
(58) Field of Classification Search .......... 296/10, 296/26.01, 26.1, 26.11, 37.6, 63, 64, 66, 296/65.01, 65.05, 65.09, 65.16, 69, 205, 296/182.1
See application file for complete search history.

(56) References Cited

U.S. PATENT DOCUMENTS

| | | | |
|---|---|---|---|
| 6,588,822 B1 * | 7/2003 | Duvall, Jr. | 296/57.1 |
| 6,644,709 B2 * | 11/2003 | Inagaki et al. | 296/37.16 |
| 6,905,159 B1 | 6/2005 | Saito et al. | |
| 6,994,388 B2 | 2/2006 | Saito et al. | |
| 6,997,500 B2 * | 2/2006 | Horsford et al. | 296/66 |
| 7,249,798 B2 | 7/2007 | Saito et al. | |
| 7,735,895 B2 * | 6/2010 | Brown et al. | 296/65.01 |
| 2006/0255613 A1 * | 11/2006 | Holmes et al. | 296/65.09 |

* cited by examiner

*Primary Examiner* — Dennis Pedder
*Assistant Examiner* — Jason S Daniels
(74) *Attorney, Agent, or Firm* — Wenderoth, Lind & Ponack, LLP

(57) ABSTRACT

A pick-up style utility vehicle has a driver's seat, a seat next to the driver's seat, one or more passenger seats behind the driver's seat, and a cargo bed. Each of all the passenger seats and the seat next to the driver's seat is independently changeable between a first state in which the seat is seatable and a second state in which the seat is retracted so that an occupied space of the seat can be used as part of the cargo bed. Preferably, a screen shield partitioning the cargo bed and a riding space in front of the cargo bed is provided. The screen shield is divided into left and right screen shield members.

2 Claims, 16 Drawing Sheets

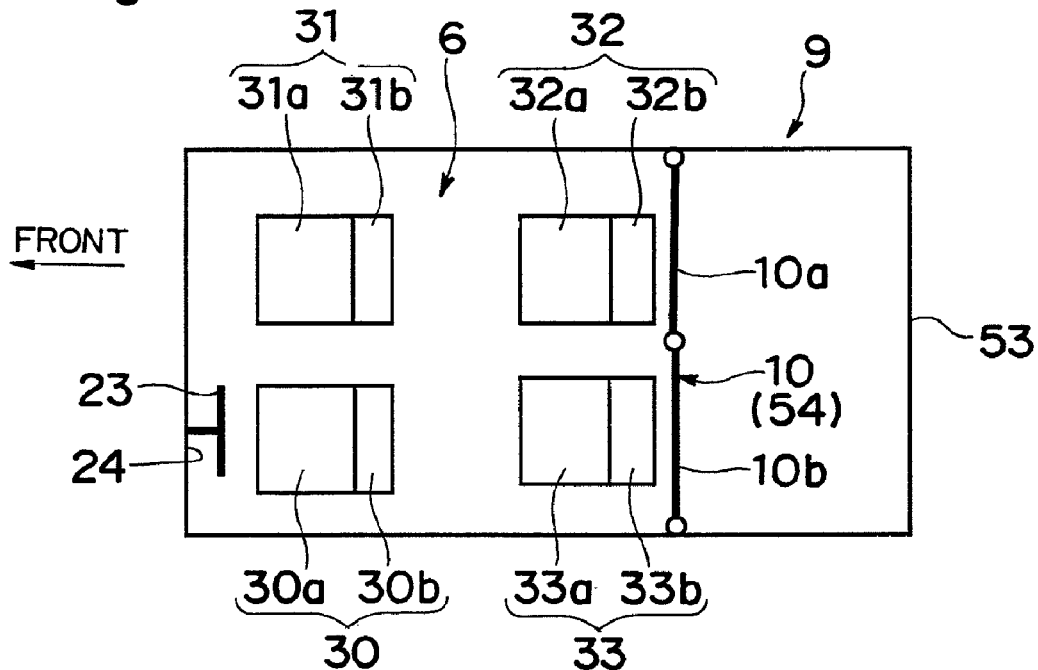
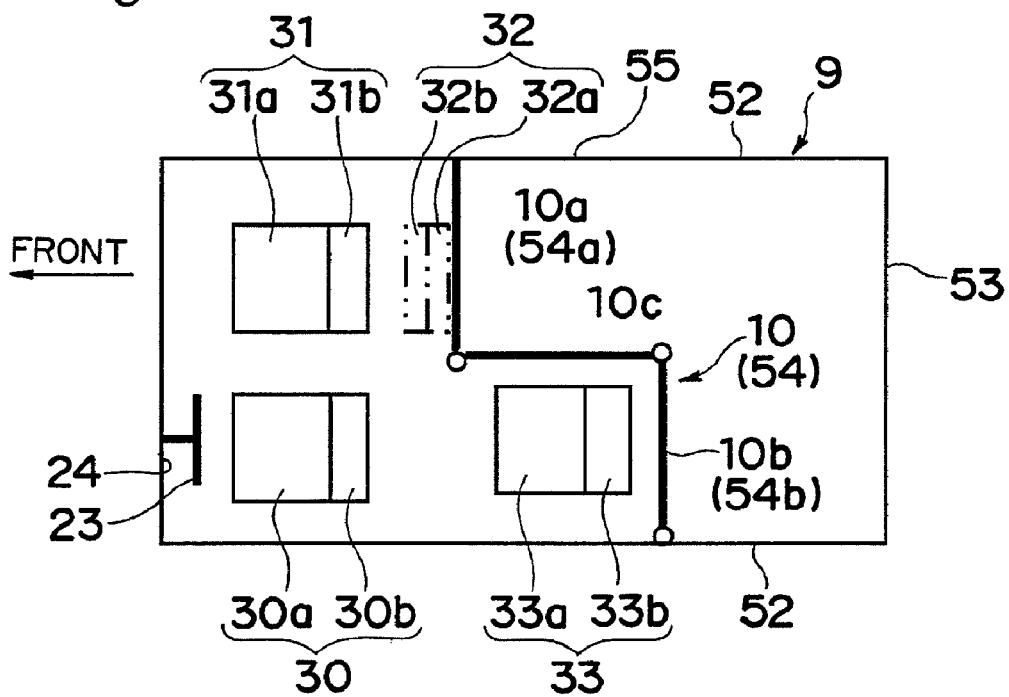

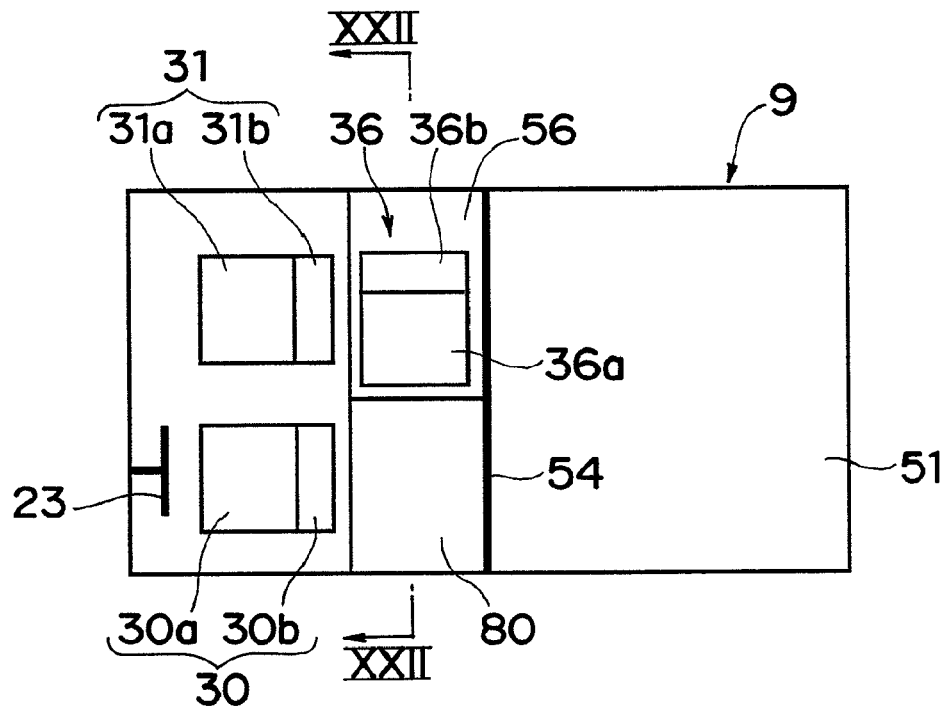
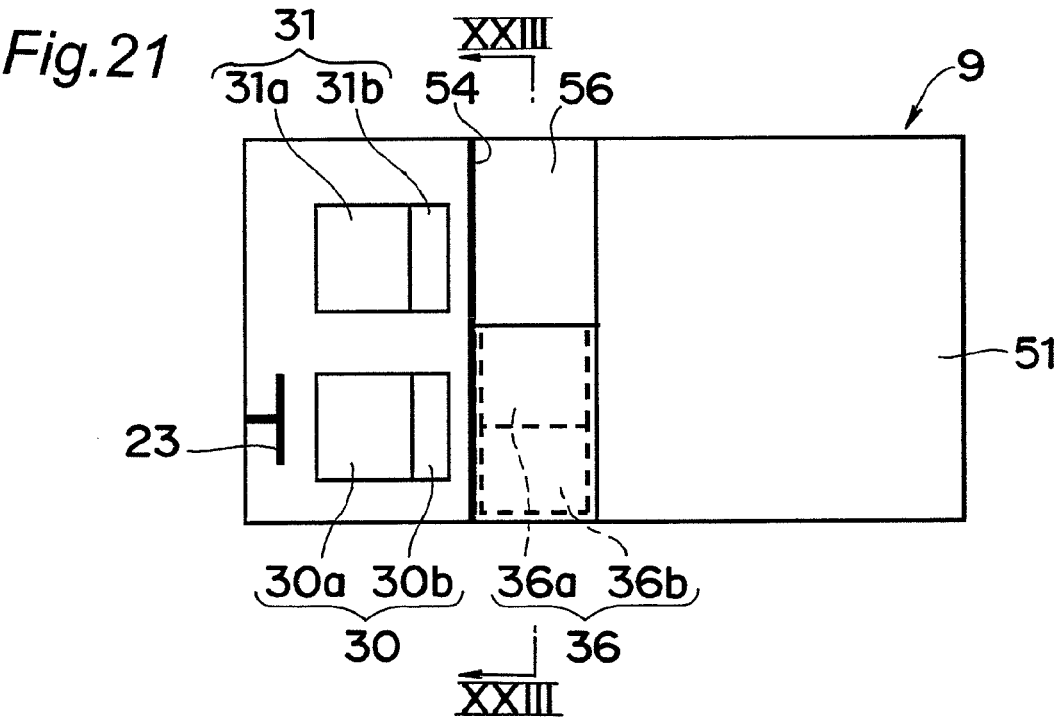

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

In the pick-up style utility vehicle of the prior art, the layout of the seats is changeable between 2 passengers transformation and 4 passengers transformation. However, the number of persons riding in the pick-up style utility vehicle is not limited to two or four and can be three or one. In this case, the seats are uselessly unoccupied.

In the pick-up style utility vehicle of the prior art, all the seats including the driver's seat are configured so that passengers are seated forward thereon. On the other hand, the gap between the rear seat and the front seat in a front-rear direction is limited, so that the leg space in front of the rear seat is small. Accordingly, it is hard to get into and off the vehicle in 4 passengers transformation.

SUMMARY OF THE INVENTION

The present invention has been made in view of the above problems and an object of the present invention is to provide a pick-up style utility vehicle which can efficiently set a riding space and a cargo bed space according to the number of passengers and facilitate getting into and off it.

To achieve the above object, a first aspect of the invention provides a pick-up style utility vehicle having a pick-up style utility vehicle having a driver's seat; a front passenger seat next to the driver's seat; one or more rear passenger seats behind the driver's seat; and a cargo bed; wherein each of all the rear passenger seats and the front passenger seat is independently changeable between a first state in which the passenger seat is seatable and a second state in which the passenger seat is retracted so that an occupied space of the passenger seat is used as part of the cargo bed.

According to the first aspect of the invention, preferably, a screen shield partitioning the cargo bed and a riding space in front of the cargo bed is provided, the screen shield is divided into left and right screen shield members, and the left and right screen shield members may be independently shiftable forward and rearward.

With the above configuration, one or more passenger seats in any number and any position other than the driver's seat can be used as part of the cargo bed according to the number of passengers and the amount of loads. Therefore, the space in the vehicle can be effectively used. In addition, with the screen shield divided into the left and right screen shield members, the left and right screen shield members can be individually arranged according to the 2, 3 or 4 passengers transformation and the position of the screen shield can be easily changed by one operator.

A second aspect of the invention provides a pick-up style utility vehicle having a driver's seat, a front passenger seat next to the driver's seat, one or more rear passenger seats behind the driver's seat, and a cargo bed, wherein at least one of the one or more rear passenger seats is changeable between a first state in which the rear passenger seat is seatable and a second state in which the rear passenger seat is retracted so that the occupied space of the rear passenger seat is used as part of the cargo bed, and the changeable rear passenger seat is installed so as to be seatable rearward or in a vehicle width direction when the changeable rear passenger seat is in the first state in which the changeable rear passenger seat is seatable.

With the above configuration, the rear passenger seat is installed rearward or in a vehicle width direction, and thus the leg space of a passenger can be secured more largely than in the case where the rear passenger seat is arranged forward. Therefore, the passenger can easily get into and out of the vehicle.

In the second aspect of the invention, the changeable rear passenger seat has a seat bottom and a backrest, the seat bottom is arranged below a bottom plate of the cargo bed, and the backrest is position changeable between an erected position in which the backrest exposes the upper surface of the seat bottom when the changeable rear passenger seat is in the first state and a fallen position in which the backrest becomes part of the bottom plate to cover the upper side of the seat bottom when the changeable rear passenger seat is in the second state.

With the above configuration, the seat bottom is arranged below the bottom plate of the cargo bed, and thus the center of gravity of the vehicle can be lowered, which is convenient for running on the irregular ground or a slope. In addition, when the rear passenger seat is retracted, the backrest becomes part of the bottom plate of the cargo bed so that the number of components can be reduced.

When a rear panel or each of side panels of the cargo bed hangs down as a leg guard in the case where the changeable rear passenger seat is in the first state in which the rear passenger seat is seatable, the legs of a passenger can be held by the leg guard so as not to be vibrated.

In the second aspect of the invention, the changeable rear passenger seat has a seat bottom and a backrest, the seat bottom is position changeable between a seatable position in which the seat bottom is located on the bottom plate when the changeable rear passenger seat is in the first state and an unseatable position in which the seat bottom becomes part of the bottom plate when the changeable rear passenger seat is in the second state, and the backrest is position changeable between an erected position corresponding to the changeable rear passenger seat in the first state and a fallen position in which the backrest becomes part of the bottom plate when the changeable rear passenger seat is in the second state.

With the above configuration, when the rear passenger seat is retracted, the backrest becomes part of the bottom plate of the cargo bed, so that the number of components can be reduced.

A third aspect of the invention provides a pick-up style utility vehicle having a driver's seat, a front passenger seat next to the driver's seat, one or more rear passenger seats behind the driver's seat, and a cargo bed, wherein at least one of the one or more rear passenger seats is changeable between a first state in which the rear passenger seat is seatable and a second state in which the rear passenger seat is retracted so that the occupied space of rear the passenger seat is used as part of the cargo bed, and a backrest of the front passenger seat is position changeable between a forward seating position in which the backrest is erected from near the rear end of a seat bottom of the front passenger seat and a rearward seating position in which the backrest is erected from near the front end of the seat bottom of the front passenger seat so that the front passenger seat is seatable rearward.

With the above configuration, part or all the passenger seats can be used as part of the cargo bed according to the number of passengers and the amount of loads and the space in the vehicle can be effectively used. In addition, at parking, the front passenger seat next to the driver's seat can be easily changed rearward and can face the rear passenger seat.

In the third aspect of the invention, the front passenger seat next to the driver's seat can be slidable forward and rearward, so that the leg space of the front passenger can be largely secured.

BRIEF DESCRIPTION OF THE DRAWINGS

FIG. 2 is a plan view of the pick-up style utility vehicle of FIG. 1 in 4 passengers transformation;

FIG. 3 is a plan view of the pick-up style utility vehicle of FIG. 1 in 3 passengers transformation;

FIG. 20 is a plan view of the pick-up style utility vehicle according to a fourth embodiment of the present invention in 3 passengers transformation;

FIG. 21 is a plan view of the pick-up style utility vehicle of FIG. 20 in 2 passengers transformation;

DETAILED DESCRIPTION OF THE PREFERRED EMBODIMENTS

First Embodiment of the Present Invention

FIGS. 1 to 10 show a first embodiment of the present invention, which will be described with reference to these drawings.

Figure 1:
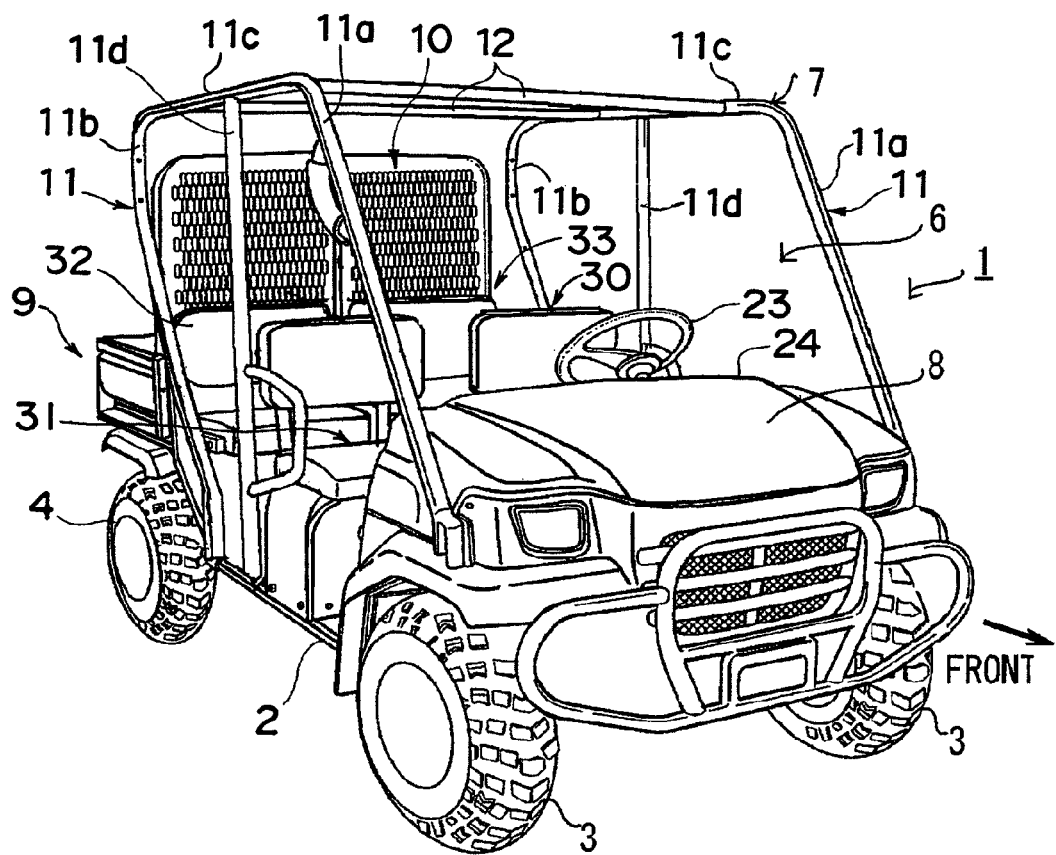
FIG. 1 is a perspective view of a pick-up style utility vehicle according to a first embodiment of the present invention.

FIG. 1 is a perspective view of a pick-up style utility vehicle. For convenience of the description, the right and left seen from a driver riding in the vehicle will be described as the right and left of the vehicle. A pick-up style utility vehicle 1 has a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood (Bonnet) 8 is provided in front of the cabin frame 7. A cargo bed 9 is provided behind the cabin frame 7. A screen shield 10 partitioning the cargo bed 9 and a riding space is provided at the front end of the cargo bed 9.

The cabin frame 7 surrounding the cabin 6 has a pair of left and right side frame members 11 formed in a U-shape and made of metal pipes, and cross frame members 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion 11d coupling the intermediate portion of the upper side portion 11c in a front-rear direction and a floor surface 6a.

FIG. 2 is a plan view of the pick-up style utility vehicle in 4 passengers transformation. For example, a driver's seat 30 is installed on the left side of the front half portion of the cabin 6, a front passenger seat 31 next to the driver's seat 30 is installed on the right side of the front half portion of the cabin 6, and a rear right passenger seat 32 and a rear left passenger seat 33 are installed in the rear half portion of the cabin 6. The driver's seat 30, the front passenger seat 31, the rear right passenger seat 32, and the rear left passenger seat 33 are installed independently. A dashboard (operating portion) 24 having a steering wheel 23 and the like is provided in front of the driver's seat 30.

(The configurations of the driver's seat 30, the front passenger seat 31 next to the driver's seat 30, and the rear passenger seats 32 and 33)

In FIG. 2, the driver's seat 30 has a seat bottom 30a and a backrest 30b for the driver's seat 30, the front passenger seat 31 has a seat bottom 31a and a backrest 31b for the front passenger seat 31, the rear right passenger seat 32 has a seat bottom 32a and a backrest 32b for the rear right passenger seat 32, and the rear left passenger seat 33 has a seat bottom 33a and a backrest 33b for the rear left passenger seat 33.

Figure 4:
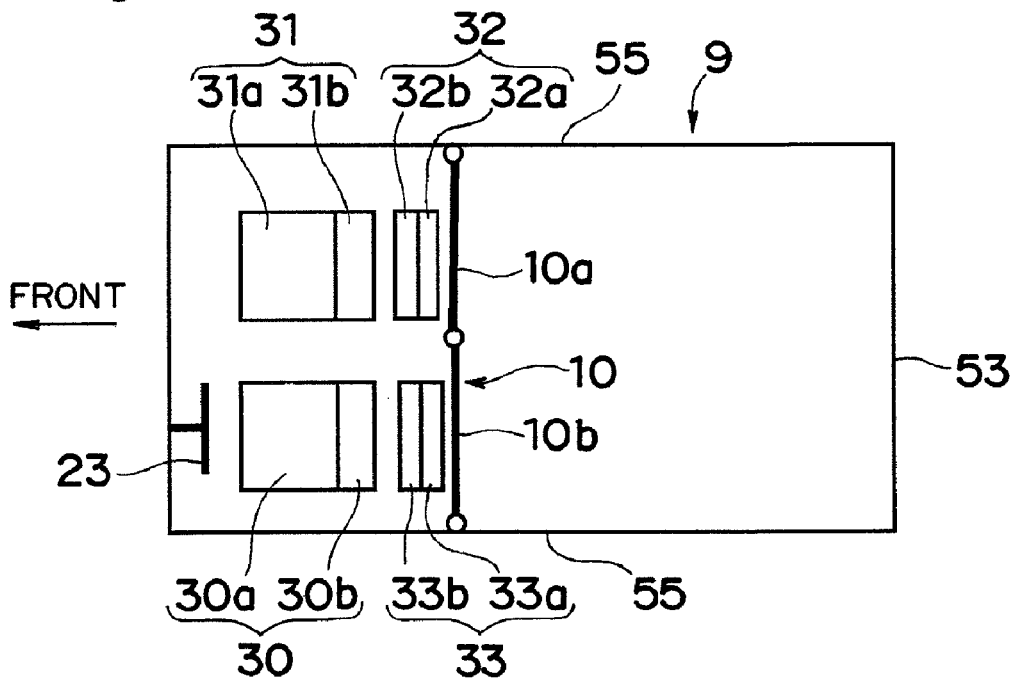
FIG. 4 is a plan view of the pick-up style utility vehicle of FIG. 1 in 2 passengers transformation.
Figure 5:
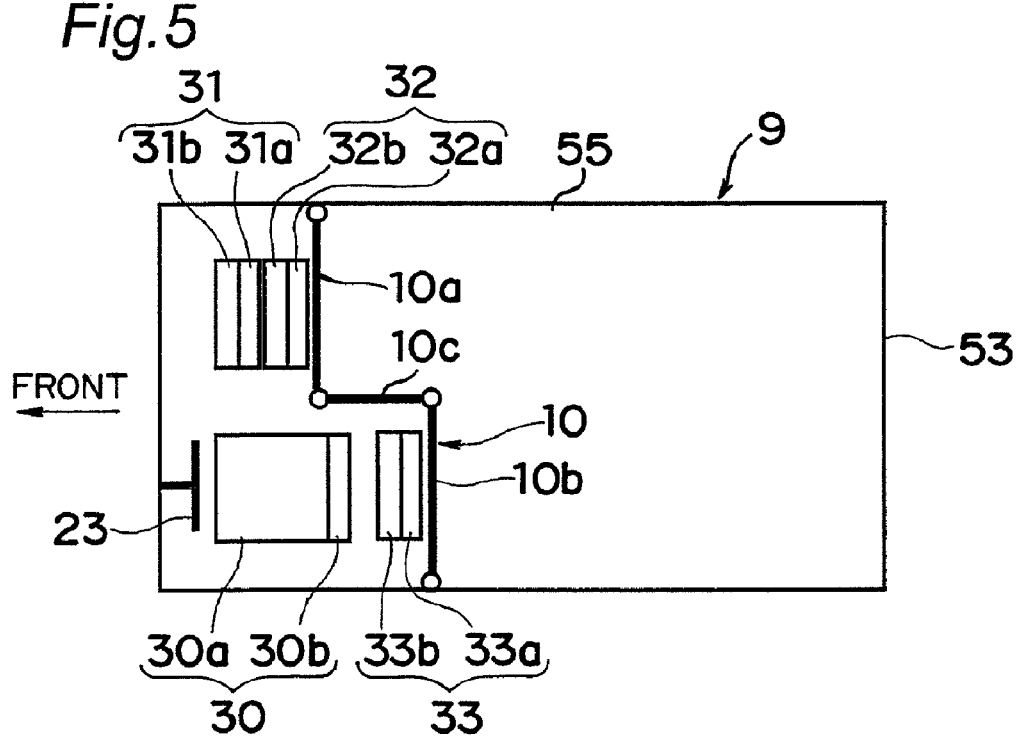
FIG. 5 is a plan view of the pick-up style utility vehicle of FIG. 1 in 1 passenger transformation.
Figure 6:
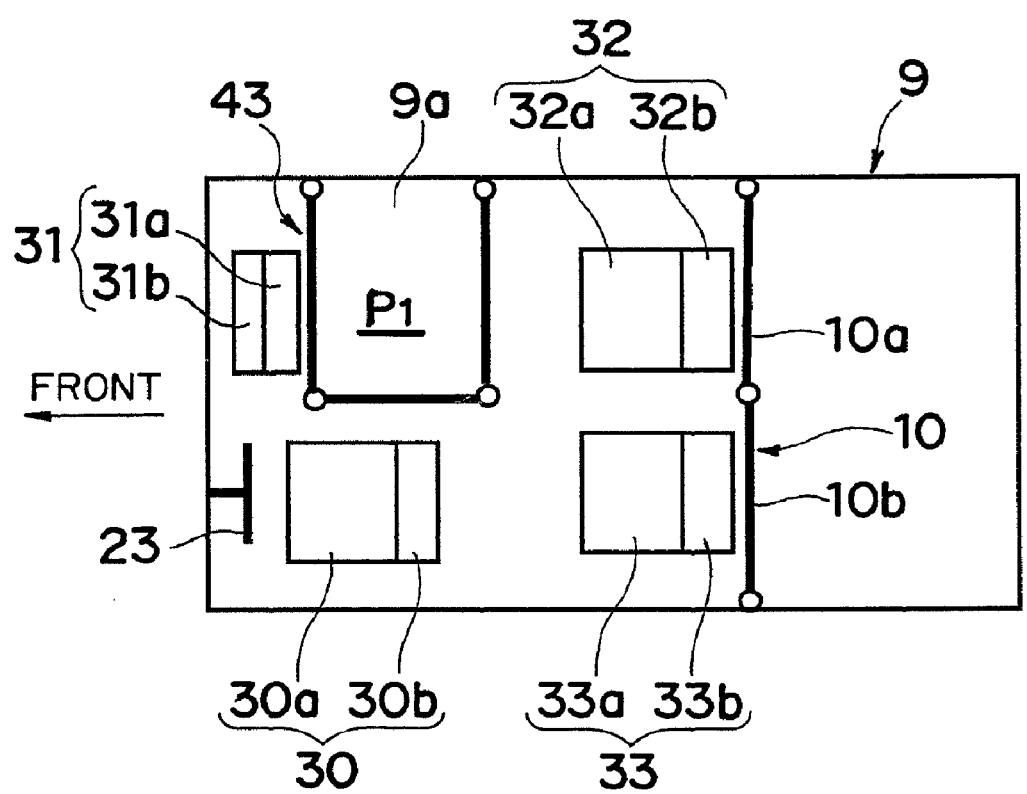
FIG. 6 is a plan view of the layout of the pick-up style utility vehicle of FIG. 1 in 3 passengers transformation different from FIG. 3.

The front passenger seat 31, the rear right passenger seat 32, and the rear left passenger seat 33 are foldable. Each of the front passenger seat 31, the rear right passenger seat 32, and the rear left passenger seat 33 is changeable between a first state in which the seat is seatable forward and a second state in which the seat is retracted so that the occupied space of the seat is used as part of the cargo bed 9. To be more specific, the front passenger seat 31 next to the driver's seat 30 is changeable between the first state in which the backrest 31b is erected at the rear end of the seat bottom 31a, as shown in FIGS. 2, 3, and 4 and the second state in which the seat bottom 31a and the backrest 31b are overlapably folded, as shown in FIGS. 5 and 6, the rear right passenger seat 32 is changeable between the first state in which the backrest 32b is erected at the rear end of the seat bottom 32a, as shown in FIGS. 2 and 6 and the second state in which the seat bottom 32a and the backrest 32b are overlapably folded, as shown in FIGS. 3 and 4, and the rear left passenger seat 33 is changeable between the first state in which the backrest 33b is erected at the rear end of the seat bottom 33a, as shown in FIGS. 2, 3, and 6 and the second state in which the seat bottom 33a and the backrest 33b are overlapably folded, as shown in FIGS. 4 and 5. As shown in FIG. 5, the rear right passenger seat 32 is changeable to a third state in which the seat is moved forward from the second state.

Figure 7:
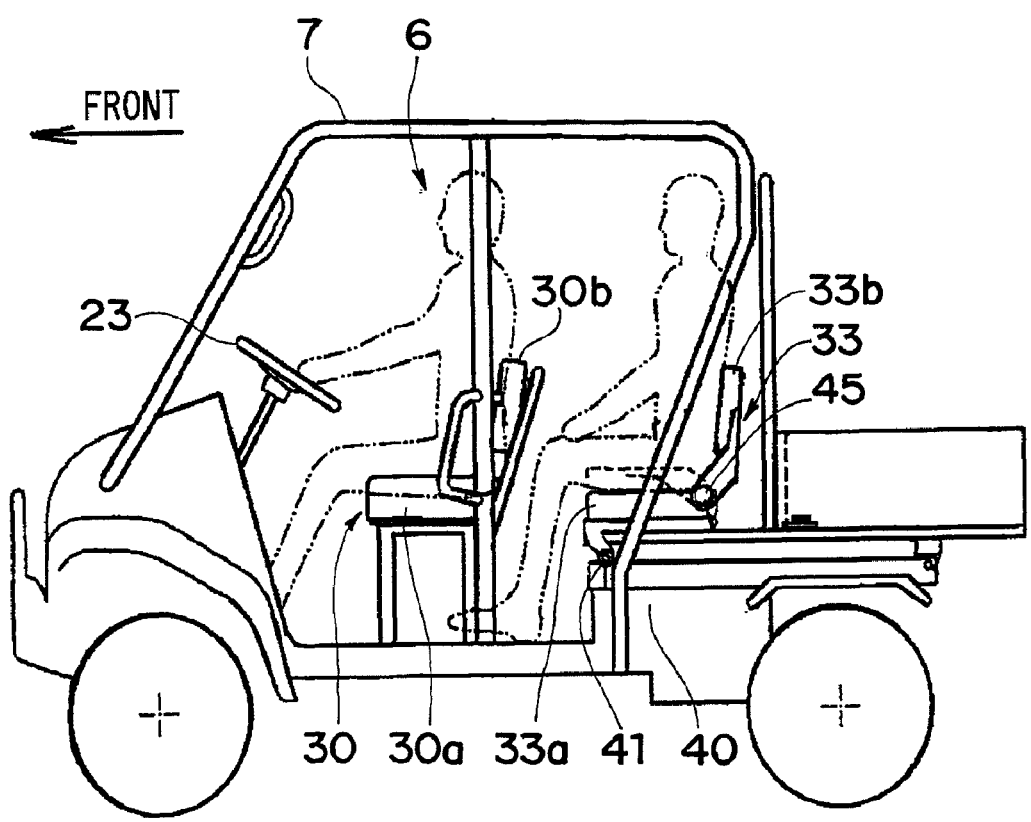
FIG. 7 is a left side view of the pick-up style utility vehicle of FIG. 1 in 4 passengers transformation.
Figure 8:
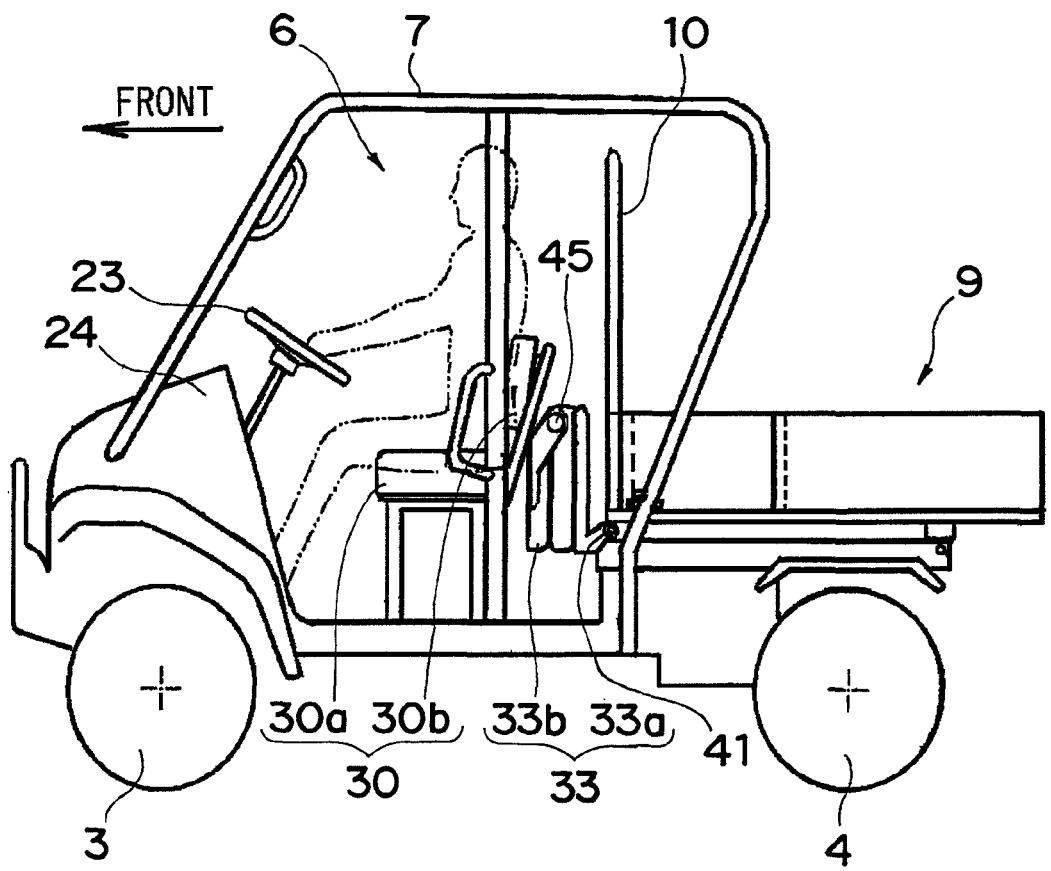
FIG. 8 is a left side view of the pick-up style utility vehicle of FIG. 1 in 2 passengers transformation.

FIG. 7 is a left side view of the pick-up style utility vehicle in 4 passengers transformation. FIG. 8 is a left side view of the pick-up style utility vehicle in 2 passengers transformation. The folded configuration of the rear left passenger seat 33 will be described with reference to these drawings.

In FIG. 7, the front end of the seat bottom 33a of the rear left passenger seat 33 is rotatably supported by the front upper end of a seat supporting base 40 via a hinge 41, and the lower end of the backrest 33b is rotatably coupled to the rear end of the seat bottom 33a via a hinge 45.

The backrest 33b of the rear left passenger seat 33 is rotated about the hinge 45 so as to be bought into contact with the upper surface of the seat bottom 33a. The seat bottom 33a is rotated about the hinge 41 together with the backrest 33b so as to be in a substantially vertical state. With this configuration, as shown in FIG. 8, the rear left passenger seat 33 can be folded in the second state. The rear left passenger seat 33 is folded and retracted so that the riding space occupied by the rear left passenger seat 33 can be used as the forward expanded space of the cargo bed 9.

The rear right passenger seat 32 and the front passenger seat 31 next to the driver's seat 30 of FIG. 2 have the same folded configuration as that of the rear left passenger seat 33. As described above, the rear right passenger seat 32 in a folded state can be moved forward to the third state shown in FIG. 5.

(The Configurations of the Cargo Bed 9 and the Screen Shield 10)

Figure 9:
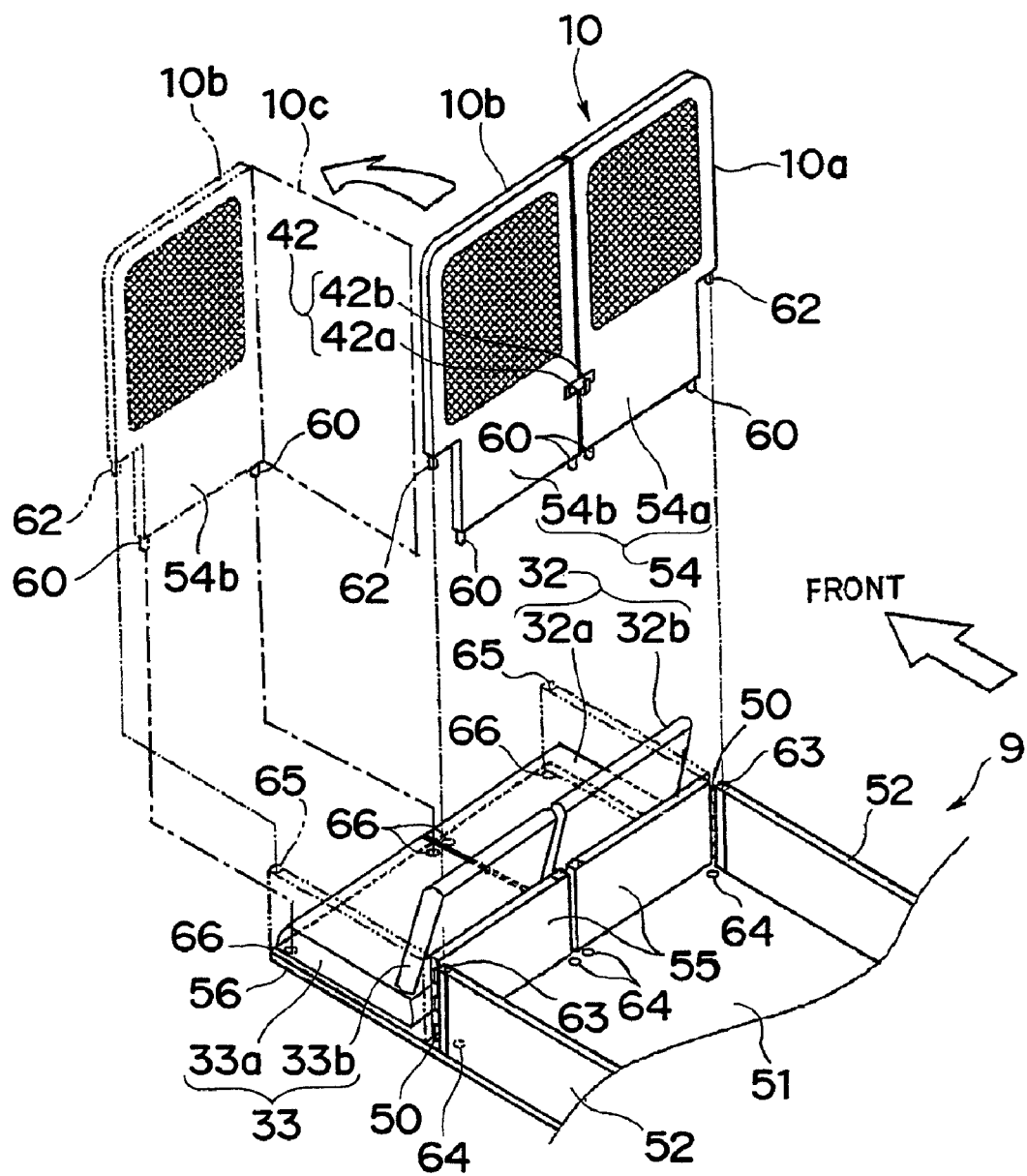
FIG. 9 is a perspective view of passenger seats, a screen shield, and a cargo bed of the pick-up style utility vehicle of FIG. 1 in 4 passengers transformation.
Figure 10:
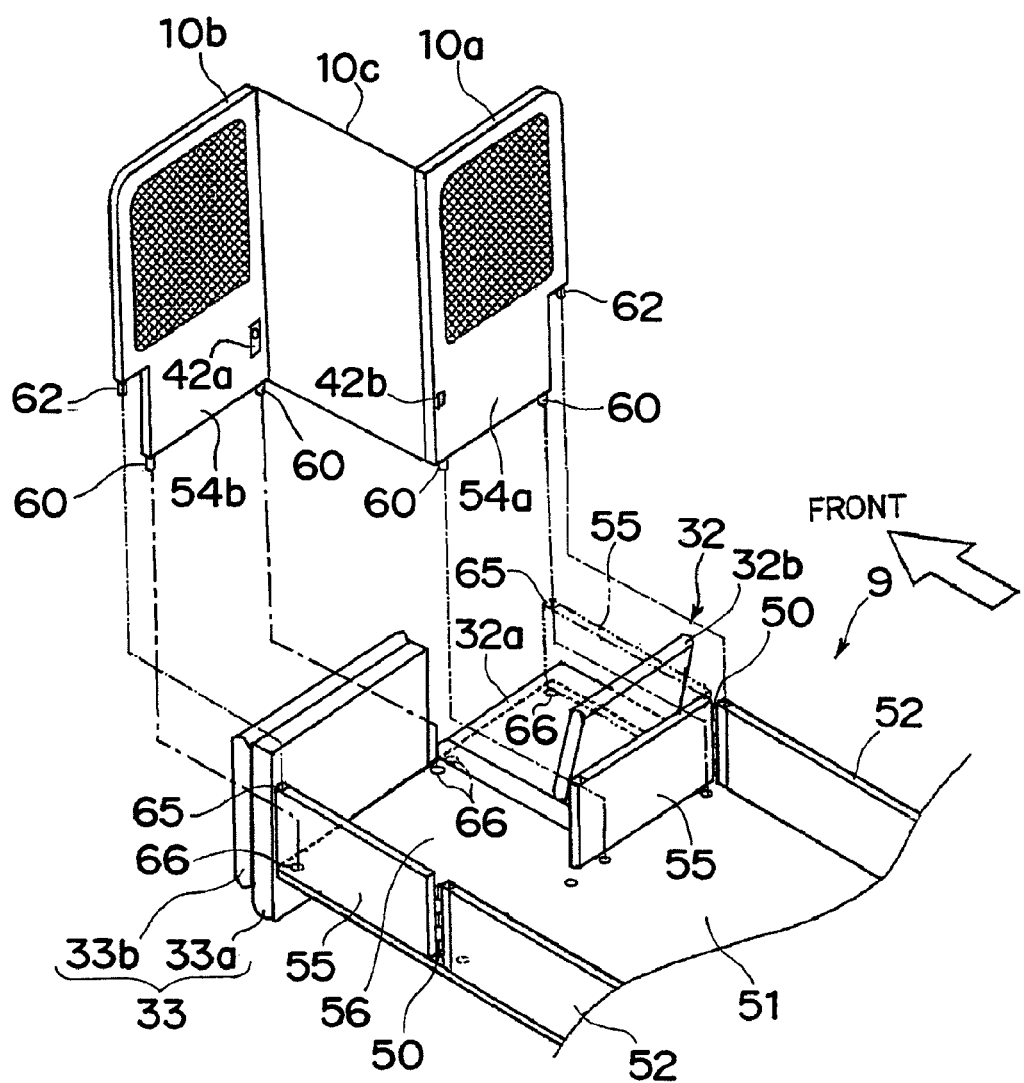
FIG. 10 is a perspective view of the passenger seats, the screen shield, and the cargo bed of the pick-up style utility vehicle of FIG. 1 in 3 passengers transformation.

FIG. 9 shows the cargo bed 9 and the screen shield 10 in 4 passengers transformation. FIG. 10 shows the cargo bed 9 and the screen shield 10 in 3 passengers transformation. In FIG. 9, the screen shield 10 is divided into a right screen shield member 10a and a left screen shield member 10b and aside from the right screen shield member 10a and the left screen shield member 10b, has an intermediate screen shield member 10c. The right screen shield member 10a and the left screen shield member 10b are provided with a metal or resin net in a frame made of metal or resin having rigidity. The intermediate screen shield member 10c has a net having bellows or flexibility. There is provided an U-shaped additional screen shield 43 to surround a space P1 occupied by the front passenger seat 31 when the front passenger seat 31 is folded in the second state, as shown in FIG. 6. When not used, the additional screen shield 43 is retracted in the cargo bed 9 or a different place.

In FIG. 9, the cargo bed 9 has, as a basic configuration, a stationary bottom plate 51, a pair of stationary side panels 52 provided substantially perpendicular to the stationary bottom plate 51 along the left and right ends of the stationary bottom plate 51, an openable and closeable gate type rear panel 53 (see FIGS. 2 and 3) provided at the rear end of the stationary bottom plate 51, and a front panel 54. In addition to these components, to expand the cargo bed 9 forward, the cargo bed 9 has a pair of left and right expandable side panels 55, and an expandable bottom plate 56 extended forward from the front end of the stationary bottom plate 51.

The front panel 54 is divided into a right front panel member 54a and a left front panel member 54b. The right front panel member 54a is formed integrally with the right screen shield member 10a. The left front panel member 54b is formed integrally with the left screen shield member 10b.

The expandable bottom plate 56 is integral with the stationary bottom plate 51 and is extended forward from the front end of the stationary bottom plate 51 on the same plane as the stationary bottom plate 51 into the rear riding space. The rear right passenger seat 32 and the rear left passenger seat 33 are installed on the expandable bottom plate 56. In the embodiment, each of the expandable side panels 55 is rotatably supported by a vertical hinge 50 provided at the front end of each of the stationary side panels 52 and is changeable between an expanded position in which the expandable side panel 55 is extended forward from the front end of the stationary side panel 52 (the state of an alternate long and two short dashes line of FIG. 9) and a non-expanded position in which the expandable side panel 55 is extended inward in a vehicle width direction from the front end of the stationary side panel 52 (the state of a solid line of FIG. 9).

The right screen shield member 10a and the left screen shield member 10b are position changeable forward and rearward independently. Lock pins 60 protruded downward are provided at the left and right ends of the lower end face of each of the front panel portions 54a and 54b integrally molded with each of the screen shield members 10a and 10b. A lock pin 62 protruded downward is provided at the outward end of each of the screen shield members 10a and 10b in a vehicle width direction. A pin hole 63 into which the lock pin 62 of the front panel 54 or each of the screen shield members 10a and 10b in the non-expanded position is inserted is formed in the upper surface of the front end of each of the stationary side panels 52. Pin holes 64 into which the lock pins 60 of the front panel 54 or each of the screen shield members 10a and 10b in the non-expanded position are inserted are formed in the front end of the stationary bottom plate 51. A pin hole 65 into which the lock pin 62 of the front panel 54 or each of the screen shield members 10a and 10b in the expanded position is inserted is formed in the upper surface of the front end of each of the expandable side panels 55. Pin holes 66 into which the lock pins 60 of the front panel 54 or each of the screen shield members 10a and 10b in the expanded position are inserted are formed in the front end of the expandable bottom plate 56. A latch mechanism 42 for coupling the screen shield members 10a and 10b in the same vertical plane is provided between the screen shield members 10a and 10b. The latch mechanism 42 has a rotatable lever 42a and a hook 42b that the lever engages.

Various layouts of the seats will be described.

(1) FIG. 2 shows the state of 4 passengers transformation. Each of the front passenger seat 31, the rear right passenger seat 32, and the passenger seat 33 is set to the first state in which the seat is seatable forward. On the other hand, the cargo bed 9 is in a non-expanded state so that the screen shield 10 (including the front panel 54) is arranged behind the rear passenger seats 32 and 33.

(2) FIG. 3 shows the state of 3 passengers transformation. Each of the front passenger seat 31 and the rear left passenger seat 33 is set to the first state in which the seat is seatable forward. The rear right passenger seat 32 is folded in the second state. The left screen shield member 10b is arranged behind the rear left passenger seat 33. The right screen shield member 10a is arranged behind the rear right passenger seat 32 folded in the second state. Accordingly, as compared with 4 passengers transformation, the cargo bed 9 is expanded to the riding space occupied by the rear right passenger seat 32. The intermediate screen shield member 10c is interposed between the right screen shield member 10a and the screen shield member 10b. The right expandable side panel 55 of the cargo bed 9 is protruded forward. In the operation of changing 4 passengers transformation to 3 passengers transformation, the entire screen shield 10 need not be moved at a time and only the right screen shield member 10a should be moved. Therefore, the moving operation of the screen shield can be performed by one operator.

FIG. 10 shows another layout in 3 passengers transformation. Each of the front passenger seat 31 and the rear right passenger seat 32 is set to the first state in which the seat is seatable forward. The rear left passenger seat 33 is folded in the second state. The right screen shield member 10a is arranged behind the rear right passenger seat 32. The left screen shield member 10b is arranged behind the rear left passenger seat 33 folded in the second state. The intermediate screen shield member 10c is interposed between the right screen shield member 10a and the left screen shield member 10b.

(3) FIG. 4 shows the state in 2 passengers transformation. The front passenger seat 31 is set to the first state in which the seat is seatable forward. The rear right passenger seat 32 and the rear left passenger seat 33 are folded in the second state. The right screen shield member 10a and the left screen shield member 10b are arranged behind the rear right passenger seat 32 and the rear left passenger seat 33 folded in the second state. Accordingly, as compared with 4 passengers transformation, the cargo bed 9 is expanded to the riding space occupied by the rear right passenger seat 32 and the rear left passenger seat 33. The left and right expandable side panels 55 of the cargo bed 9 are protruded forward. When 4 passengers transformation is changed to 2 passengers transformation, the right screen shield member 10a and the left screen shield member 10b can be moved separately without moving the entire screen shield 10. Therefore, the moving operation of the screen shield can be performed by one operator.

(4) FIG. 5 shows the state in 1 passenger transformation. The seat front passenger seat 31 next to the driver's seat 30 and the rear left passenger seat 33 are folded in the second state. The rear right passenger seat 32 is folded and is moved forward to the third state. The right screen shield member 10a is arranged behind the rear right passenger seat 32 folded in the third state. The left screen shield member 10b is arranged behind the rear left passenger seat 33 folded in the second state. Accordingly, as compared with 4 passengers transformation, the cargo bed 9 is expanded to the riding space occupied by the rear right passenger seat 32, the rear left passenger seat 33, and the front passenger seat 31. The right expandable side panel 55 of the cargo bed 9 is protruded more forward. When 4 passengers transformation is changed to 1 passenger transformation, the right screen shield member 10a and the left screen shield member 10b can be moved separately without moving the entire screen shield 10 at a time. Therefore, the moving operation of the screen shield can be performed by one operator.

(5) FIG. 6 shows the state in irregular 3 passengers transformation. Each of the rear right passenger seat 32 and the left passenger seat 33 is set to the first state in which the seat is seatable forward. The front passenger seat 31 is folded in the second state. The right screen shield member 10a and the left screen shield member 10b are arranged behind the rear right passenger seat 32 and the rear left passenger seat 33. The space P1 occupied by the front passenger seat 31 in the first state is surrounded by the additional screen shield 43 formed in a U-shape as seen from above. Accordingly, as compared with 4 passengers transformation, the riding space P1 occupied by the front passenger seat 31 in the first state is added to the cargo bed 9.

In this manner, in the first embodiment, each of the front passenger seat 31 and the two passenger seats 32 and 33 is changeable between the first state in which the seat is seatable and the second state in which the seat is retracted. Therefore, the layout of the seats is changed according to the number of passengers and the amount of loads so that the limited space of the vehicle can be effectively used.

[Modification Example of the First Embodiment]

Figure 11:
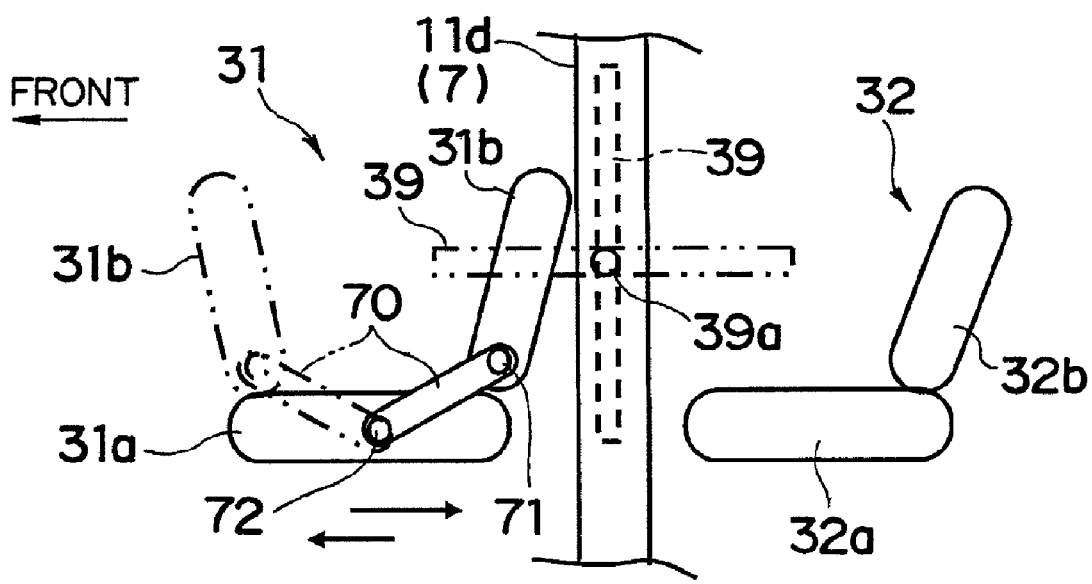
FIG. 11 is a side view of a seat next to a driver's seat of a modification example of the first embodiment of the present invention.
Figure 12:
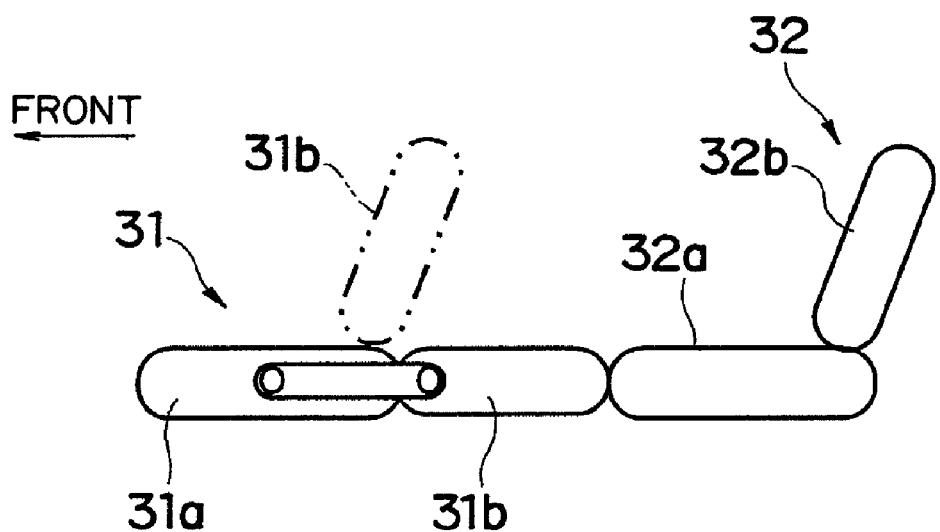
FIG. 12 is a side view showing the state that the seat next to the driver's seat of FIG. 11 is fallen in a planar manner.

FIGS. 11 and 12 show a modification example of the first embodiment. As shown in FIG. 11, the lower end of the backrest 31b of the front passenger seat 31 is rotatably coupled to the substantially center portion of the seat bottom 31a in a front-rear direction by pins 71, 72, and a link 70, and is changeable between a forward position in which the backrest 31b is erected from the rear end of the seat bottom 31a and a front passenger next to a driver can be seated forward, as indicated by a solid line and a rearward position in which the backrest 31b is erected from the front end of the seat bottom 31a and the front passenger next to the driver can be seated rearward, as indicated by an alternate long and two short dashes line.

As shown in FIG. 12, the backrest 31b can be fallen rearward in a flat manner so as to be on substantially the same plane as the seat bottom 32a of the rear right passenger seat 32 behind the backrest 31b.

The front passenger seat 31 next to the driver's seat 30 of the modification example is slidable forward and rearward. The front passenger seat 31 is slid forward so that the leg space of the rear right passenger seat 32 behind the front passenger seat 31 can be enlarged.

According to the modification example, the front passenger seat 31 is located in the rearward position indicated by an alternate long and two short dashes line of FIG. 11, so that the front passenger seated on the front passenger seat 31 can be seated so as to face a passenger seated on the rear right passenger seat 32.

According to the modification example, as shown in FIG. 12, the front passenger backrest 31*b* is in a horizontal position so as to be aligned with the seat bottom 32*a*. In this position, the front passenger can lie on his/her back.

According to the modification example, as shown in FIG. 11, a table 39 is rotatably supported by the intermediate vertical portion 11*d* of the cabin frame 7 via a horizontal supporting shaft 39*a*. The table 39 typically holds a substantially vertical posture. When the front passenger seat 31 is set to the rearward position, the table 39 is rotated into a horizontal state, as indicated by an alternate long and two short dashes line, and can be used for placing dishes and the like thereon.

[Second Embodiment]

Figure 13:
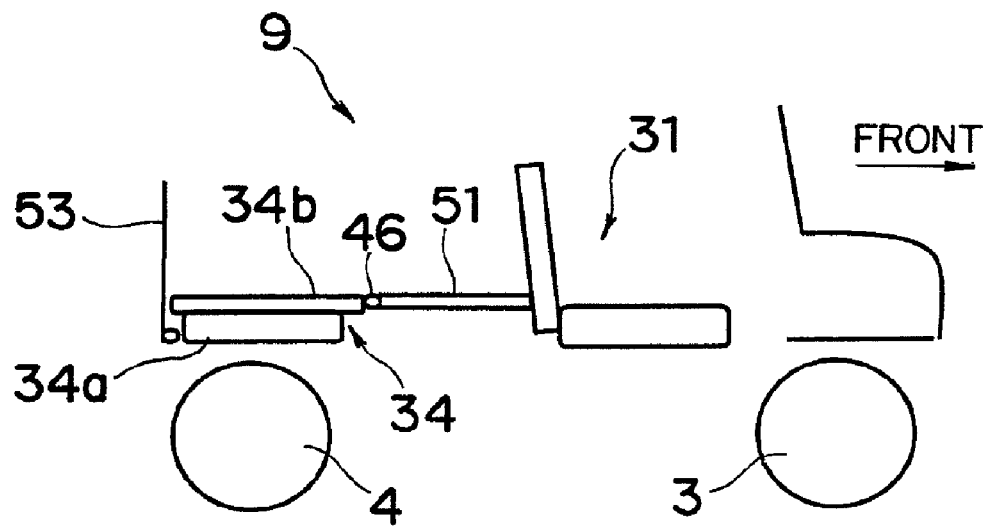
FIG. 13 is a right side view of the pick-up style utility vehicle according to a second embodiment of the present invention in 2 passengers transformation.
Figure 14:
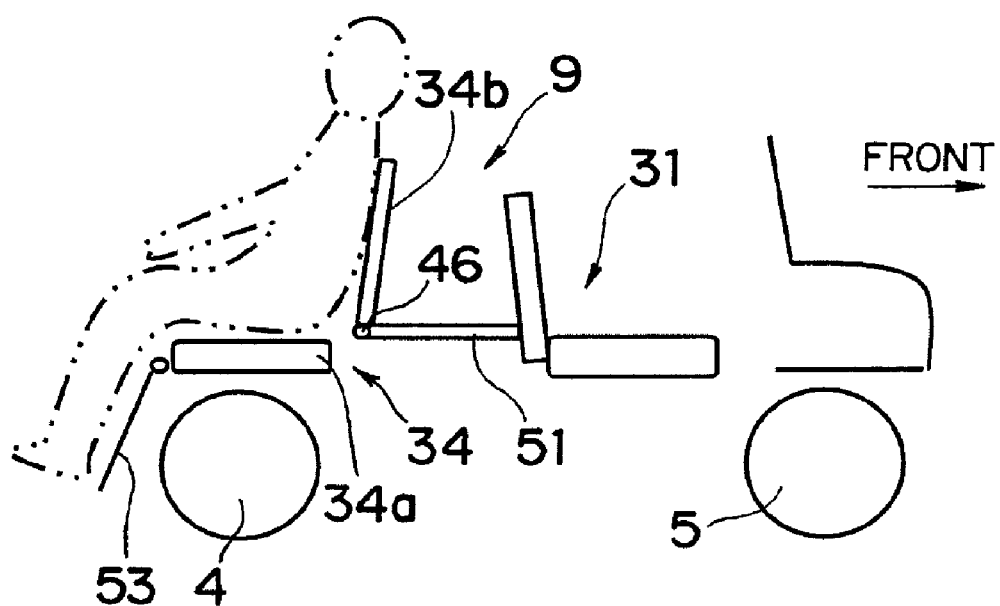
FIG. 14 is a right side view of the pick-up style utility vehicle of FIG. 13 in 3 passengers transformation.
Figure 15:
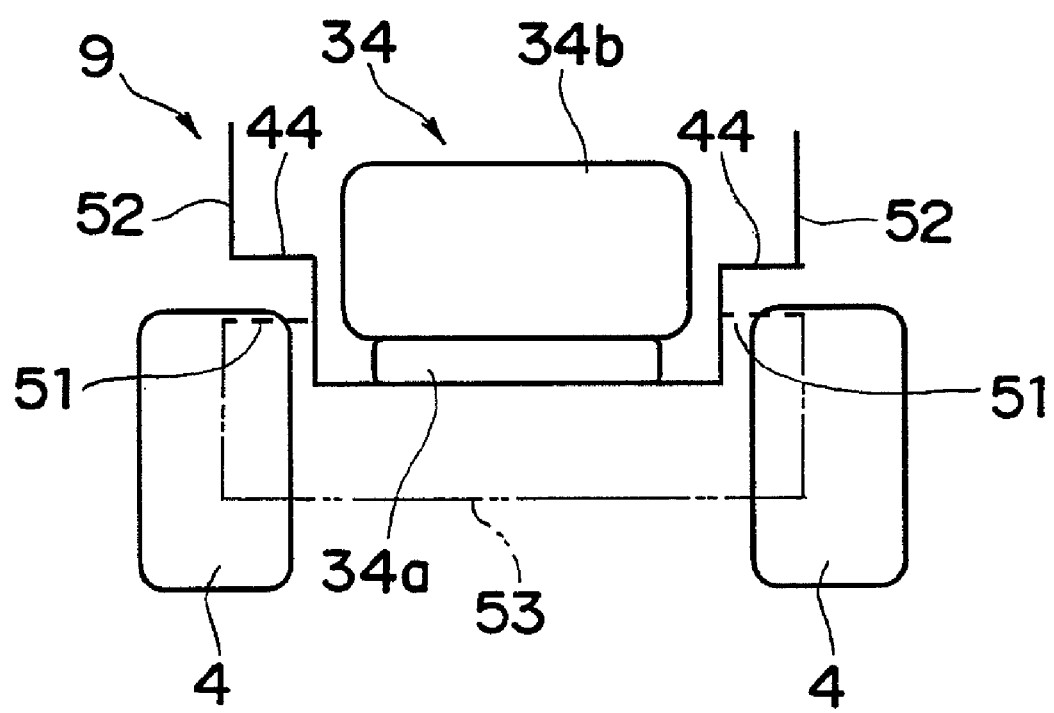
FIG. 15 is a rear view of FIG. 14.

FIGS. 13 to 15 show a second embodiment of the present invention. One rear passenger seat 34 is installed at the rear end of the cargo bed 9 so that a passenger can be seated rearward.

FIG. 13 is a right side view of the pick-up style utility vehicle in which the rear passenger seat 34 is retracted in the second state. A seat bottom 34*a* is arranged in the position lower than the bottom plate 51 of the cargo bed 9. The front end of a backrest 34*b* is rotatably supported at the rear end of the bottom plate 51 via a hinge 46. The backrest 34*b* is overlapped with the upper surface of the seat bottom 34*a*. The back surface of the backrest 34*b* is located on substantially the same plane as the bottom plate 51 of the cargo bed 9 to configure part of the bottom plate of the cargo bed 9.

FIG. 14 is a right side view of the pick-up style utility vehicle in which the rear passenger seat 34 is in the first state in which the seat is seatable. The backrest 34*b* is erected from the front end of the seat bottom 34*a*. The rear panel 53 of the cargo bed 9 hangs down and serves as a leg guard. The passenger can be seated rearward on the rear passenger seat 34 in the first state.

FIG. 15 is a rear view of FIG. 14. The rear passenger seat 34 is arranged in the substantially center portion of the cargo bed 9 in a vehicle width direction. Rear fenders 44 covering the upper sides of the left and right rear wheels 4 are arranged in the position upper than the bottom plate 51 and can be used as an armrest.

According to the embodiment, the rear passenger seat 34 is installed behind the cargo bed 9 so that the passenger can be seated rearward. Therefore the passenger can easily get into and off the rear side of the cargo bed 9. In addition, the seat bottom 34*a* is arranged in the position lower than the bottom plate 51 so that the center of gravity of the vehicle can be lowered. When running on the irregular ground or a sloped place, the vehicle is stable.

Further, the rear panel 53 of the cargo bed 9 is used as a guard. The legs of the seating passenger can be held into a stable state. They can also be protected from a stone scattered by a tire.

[Third Embodiment]

FIGS. 16 to 19 show a third embodiment of the present invention. Two rear passenger seats 35 are installed in the cargo bed 9 so that two passengers can be seated outward in a vehicle width direction.

Figure 16:
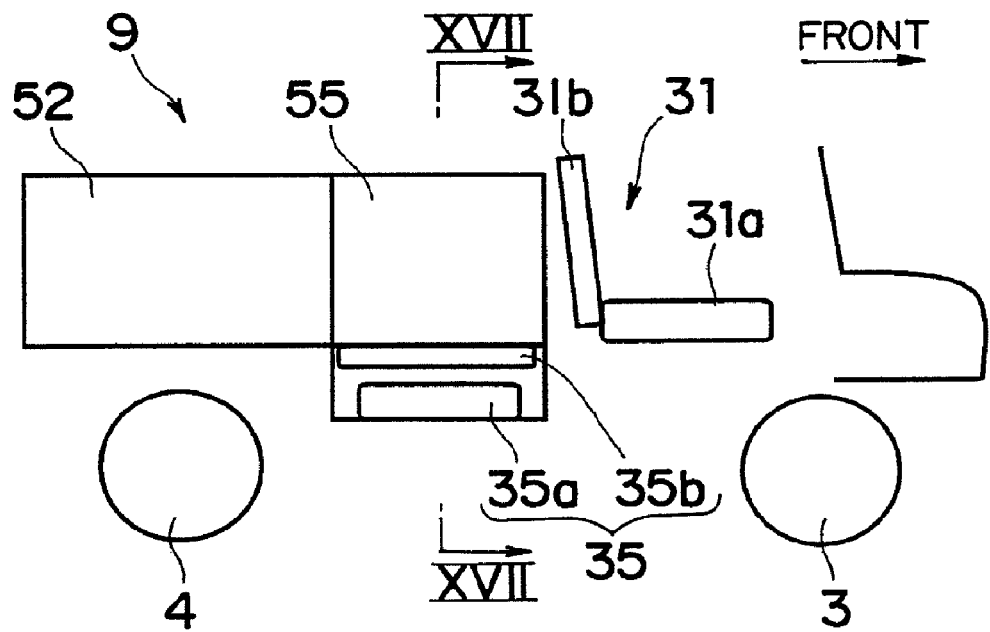
FIG. 16 is a right side view of the pick-up style utility vehicle according to a third embodiment of the present invention in 2 passengers transformation.
Figure 17:
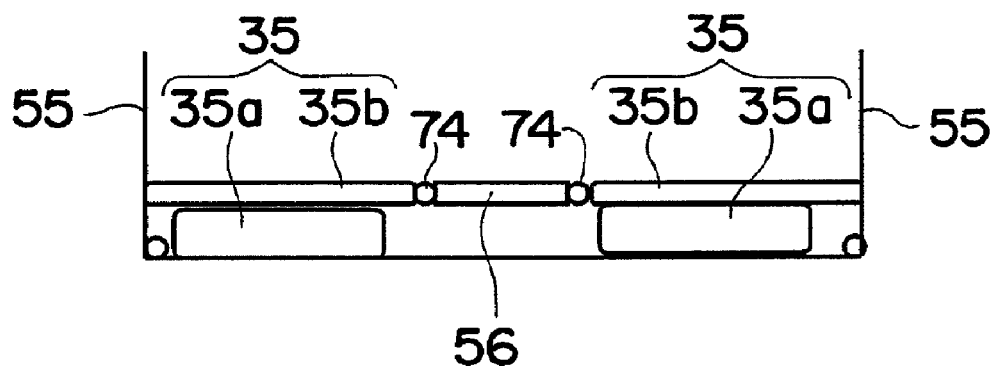
FIG. 17 is a cross-sectional view taken along line XVII-XVII of FIG. 16.

FIG. 16 is a right side view of the pick-up style utility vehicle in which the rear passenger seat 35 is retracted in the second state. FIG. 17 is a cross-sectional view of XVII-XVII of FIG. 16. A seat bottom 35*a* is fixed in the front portion of the cargo bed 9 so as to be in the position lower than the bottom plate 51. A backrest 35*b* is overlapped with the upper surface of the seat bottom 35*a*. The back surface of the backrest 35*b* is located on substantially the same plane as the bottom plate 51 of the cargo bed 9 to configure part of the bottom plate of the cargo bed 9.

The inward end of each of the left and right backrests 35*b* in a vehicle width direction is rotatably supported via a hinge 74. The left and rear backrests 35*b* are fallen on substantially the same plane as the bottom plate 51 and are used as part of the bottom plate of the cargo bed 9.

Figure 18:
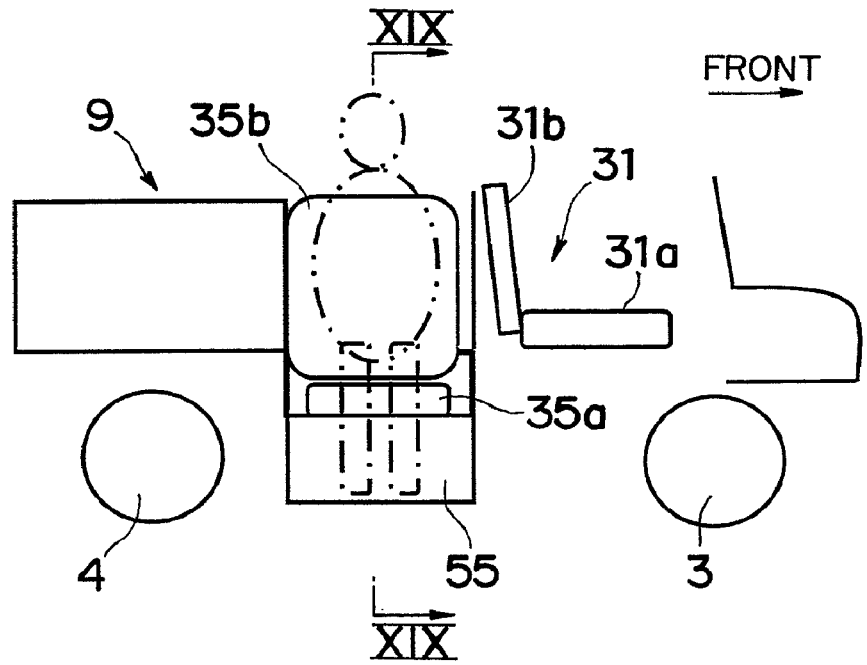
FIG. 18 is a right side view of the pick-up style utility vehicle of FIG. 16 in 4 passengers transformation.

FIG. 18 is a right side view of the pick-up style utility vehicle in which each of the rear left and right passenger seats 35 is in the first state in which the seat is seatable. The backrest 35*b* is erected from the inward end of the seat bottom 35*a* in a vehicle width direction. The expandable side panel 55 of the cargo bed 9 is rotated via a hinge 77 so as to hang down and serves as a leg guard.

Figure 19:
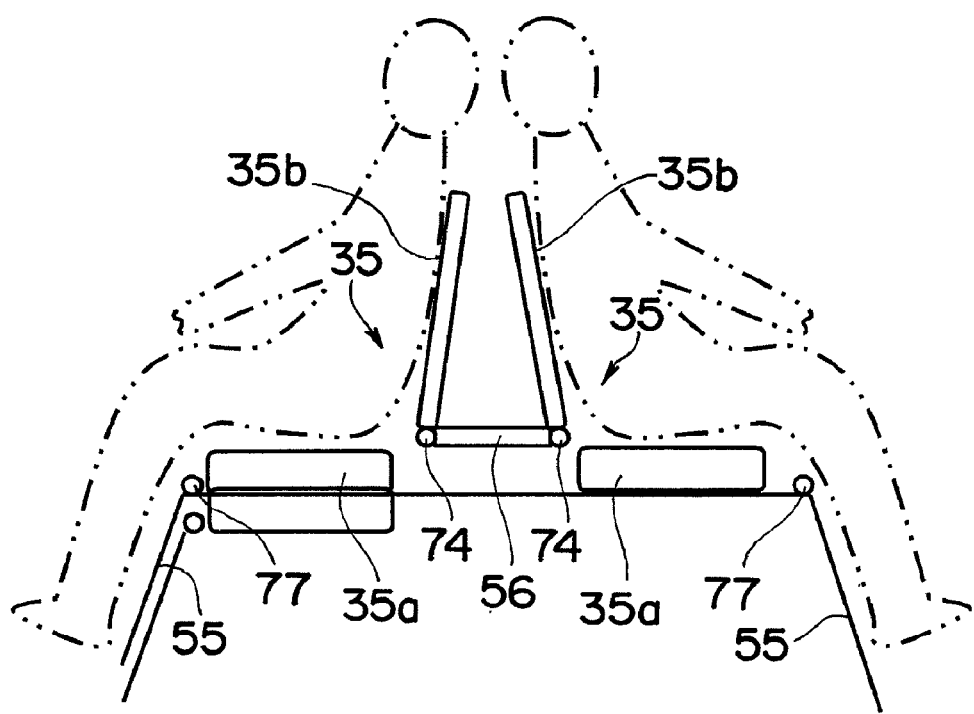
FIG. 19 is a cross-sectional view taken along line XIX-XIX of FIG. 18.

FIG. 19 is a cross-sectional view taken along line XIX-XIX of FIG. 18. Each of the passengers can be seated on the left or right passenger seat 35 outward in a vehicle width direction.

According to the embodiment, each of the left and right passenger seats 35 is installed in the cargo bed 9 so as to be directed outward in a vehicle width direction, so that each of the passengers can easily get into and off the left or right side of the cargo bed 9. In addition, each of the seat bottoms 35*a* is installed in the position lower than the bottom plates 51 and 56, so that the center of gravity of the vehicle can be lowered and when running on the irregular ground or a sloped place, the vehicle is stable.

The expandable side panel 55 of the cargo bed 9 is used as the leg guard so that the legs of each of the seating passengers can be held into a stable state. Further, they can also be protected from a stone scattered by a tire.

[Fourth Embodiment]

FIGS. 20 to 23 show a fourth embodiment of the present invention. One rear passenger seat 36 is installed at the front end of the cargo bed 9 so that a passenger can be seated in a vehicle width direction.

FIG. 20 is a plan view of the pick-up style utility vehicle in which the rear passenger seat 36 is in the first state in which the seat is seatable. The expandable bottom plate 56 is arranged in the right half (or the left half) of the cargo bed 9. A seat bottom 36*a* of the rear passenger seat 36 is arranged on the expandable bottom plate 56.

Figure 22:
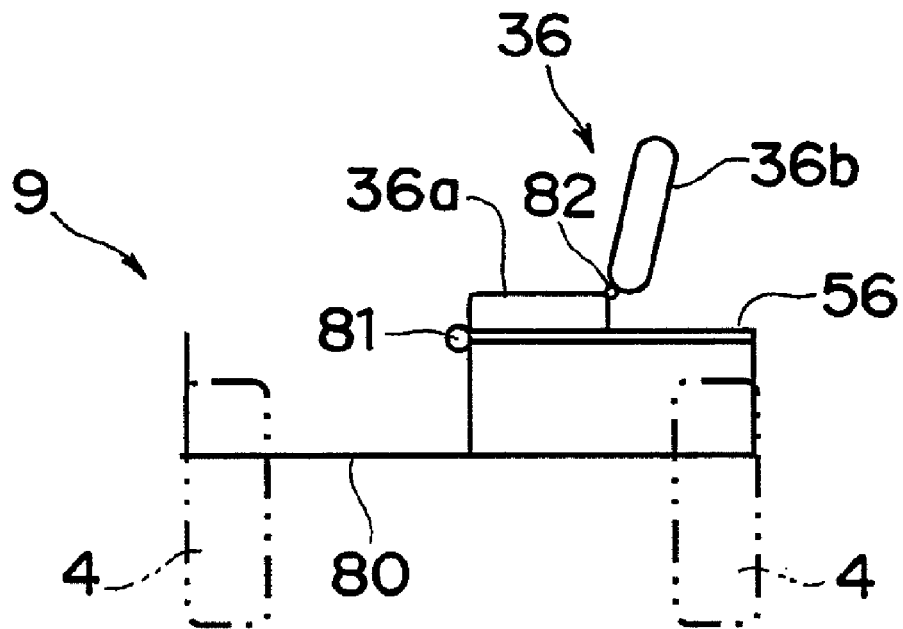
FIG. 22 is a cross-sectional view taken along line XXII-XXII of FIG. 20.

FIG. 22 is a cross-sectional view taken along line XXII-XXII of FIG. 20. The left end of the seat bottom 36*a* is rotatably supported at the left end of the expandable bottom plate 56 via a hinge 81. A backrest 36*b* is rotatably coupled to the right end of the seat bottom 36*a* via a hinge 82 and is erected. A footrest 80 is installed in the left half (or the right half) of the cargo bed 9 so as to be in the position lower than the expandable bottom plate 56.

Figure 23:
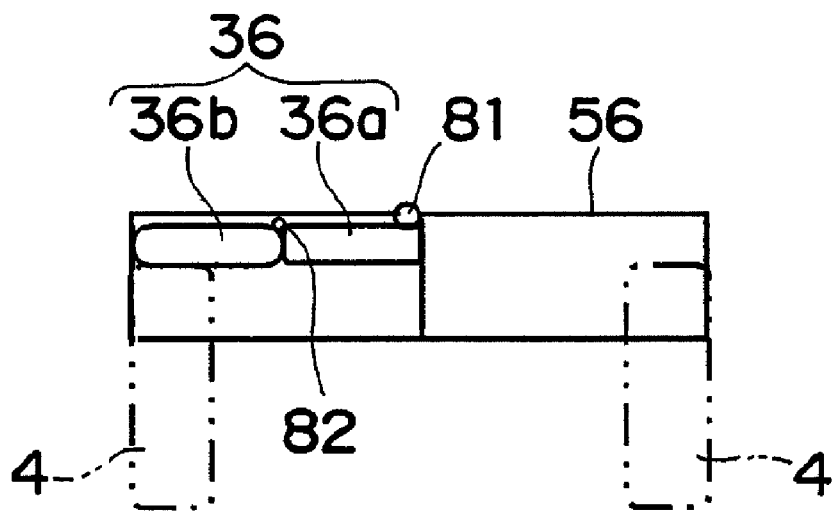
FIG. 23 is a cross-sectional view taken along line XXIII-XXIII of FIG. 21.

FIG. 21 is a plan view of the pick-up style utility vehicle in which the rear passenger seat 36 is retracted in the second state. FIG. 23 is a cross-sectional view taken along line XXIII-XXIII of FIG. 21. The seat bottom 36*a* and the backrest 36*b* are enlarged so as to be on substantially the same plane. The back surface of the seat bottom 36*a* and the back surface of the backrest 36*b* are fixed on substantially the same plane as the expandable bottom plate 56 and are used as part of the bottom plate.

In the embodiment, the front panel 54 of the cargo bed 9 is shiftable forward and rearward according to the change of the cargo bed 9, however, the front panel 54 can be doubled in 3 passengers transformation of FIG. 20 and when 3 passengers transformation is changed to 2 passengers transformation, as shown in FIG. 21, one front panel 54 can cover the upper side of the rear passenger seat 36 in the second state and the expandable bottom plate 56 and the other front panel 54 can be erected in front of the rear passenger seat 36 and the expandable bottom plate 56.

According to the embodiment, the rear passenger seat 36 is installed in the cargo bed 9 so as to be directed outward in a vehicle width direction so that the passenger can easily get into and off the side of the cargo bed 9.

[Modification Example of the Fourth Embodiment]

Figure 24:
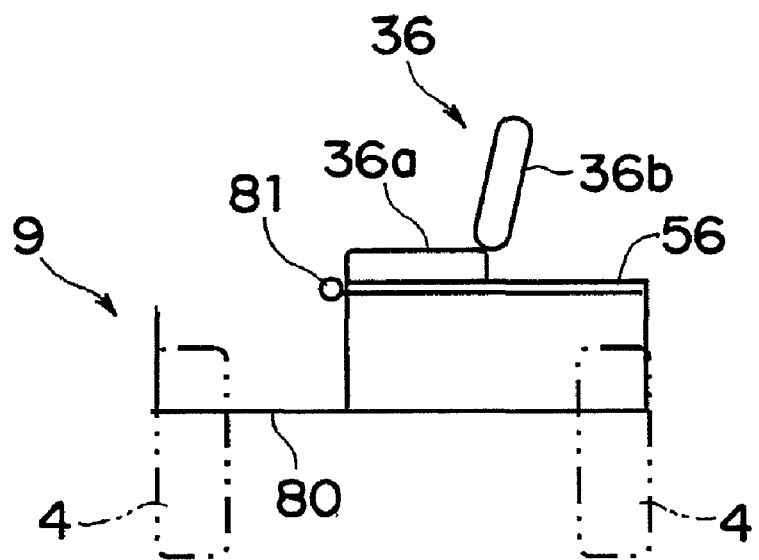
FIG. 24 is a cross-sectional view of a modification example of the fourth embodiment in 3 passengers transformation of FIG. 22.
Figure 25:
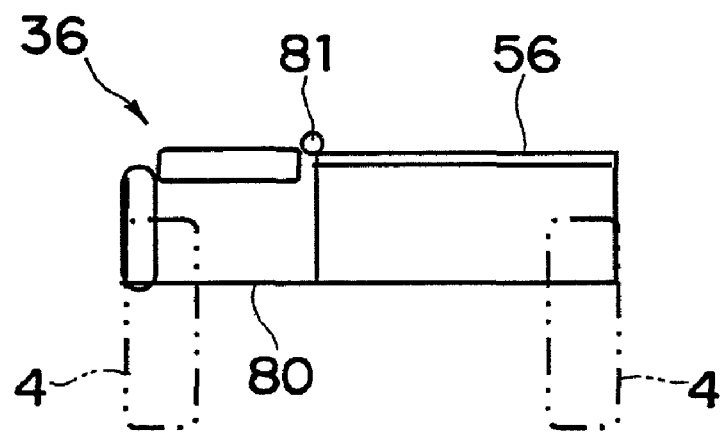
FIG. 25 is a cross-sectional view of the pick-up style utility vehicle of FIG. 24 in 2 passengers transformation.

FIGS. 24 and 25 show a modification example of the fourth embodiment. Basically, the modification example of the fourth embodiment has the same configuration as that of the rear passenger seat 36 of FIGS. 20 to 23 except that the backrest 36*b* is fixed to the seat bottom 36*a*. As shown in FIG. 25, when retracted in the second state, the seat bottom 36*a* and the backrest 36*b* are rotated about the hinge 81 in a state in which they are held in an L shape and only the back surface of the seat bottom 36*a* is used as part of the bottom plate. According to the third and fourth embodiments, the rear passenger seat 36 can be directed rightward and leftward.

The present invention is not limited to the configurations of the above embodiments and includes various modification examples contemplated in the scope without departing from the contents described in the scope of claims.

What is claimed is:

1. A pick-up style utility vehicle comprising:
   a driver's seat;
   a front passenger seat next to the driver's seat;
   one or more rear passenger seats behind the driver's seat and
   a cargo bed, wherein:
   at least one of the one or more rear passenger seats is changeable between a first state in which the rear passenger seat is seatable and a second state in which the rear passenger seat is retracted so that the rear passenger seat is used as part of the cargo bed;
   the changeable rear passenger seat has a seat bottom and a backrest and is installed so as to be seatable in a vehicle width direction when the changeable rear passenger seat is in the first state in which the changeable rear passenger seat is seatable;
   the seat bottom is arranged below a bottom plate of the cargo bed;
   the backrest is position changeable between an erected position in which the backrest exposes the upper surface of the seat bottom when the changeable rear passenger seat is in the first state and a fallen position in which the backrest becomes part of the bottom plate to cover the upper side of the seat bottom when the changeable rear passenger seat is in the second state;
   the cargo bed has a rear panel erected from the rear end of the cargo bed and a pair of side panels erected from the left and right ends of the cargo bed; and
   part of each of the side panels hangs down when the changeable rear passenger seat is in the first state in which the rear passenger seat is seatable.

2. The pick-up style utility vehicle according to claim 1, wherein the changeable rear passenger seat includes right and left changeable rear passenger seats.

* * * * *